(12) United States Patent
Boehm et al.

(10) Patent No.: US 11,829,612 B2
(45) Date of Patent: Nov. 28, 2023

(54) SECURITY TECHNIQUES FOR LOW POWER MODE OF MEMORY DEVICE

(71) Applicant: Micron Technology, Inc., Boise, ID (US)

(72) Inventors: Aaron P. Boehm, Boise, ID (US); Lance W Dover, Fair Oaks, CA (US); Steffen Buch, Munich (DE)

(73) Assignee: Micron Technology, Inc., Boise, ID (US)

( * ) Notice: Subject to any disclaimer, the term of this patent is extended or adjusted under 35 U.S.C. 154(b) by 104 days.

(21) Appl. No.: 17/396,528

(22) Filed: Aug. 6, 2021

(65) Prior Publication Data

US 2022/0057945 A1 Feb. 24, 2022

Related U.S. Application Data

(60) Provisional application No. 63/068,320, filed on Aug. 20, 2020.

(51) Int. Cl.
*G06F 3/06* (2006.01)
(52) U.S. Cl.
CPC .......... *G06F 3/0625* (2013.01); *G06F 3/0619* (2013.01); *G06F 3/0652* (2013.01); *G06F 3/0659* (2013.01); *G06F 3/0679* (2013.01)
(58) Field of Classification Search
CPC .... G06F 3/0625; G06F 3/0619; G06F 3/0652; G06F 3/0659; G06F 3/0679; G06F 3/0634; G06F 3/0688; G06F 21/575; G06F 21/57
See application file for complete search history.

(56) References Cited

U.S. PATENT DOCUMENTS

| | | | |
|---|---|---|---|
| 10,396,063 B2 | 8/2019 | Chang et al. | |
| 10,516,533 B2 | 12/2019 | Mannan et al. | |
| 2008/0244292 A1* | 10/2008 | Kumar | G06F 9/45558 718/1 |
| 2015/0013002 A1 | 1/2015 | Smith et al. | |
| 2015/0334114 A1* | 11/2015 | Scarlata | G06F 21/81 713/170 |
| 2017/0147358 A1 | 5/2017 | Rothman et al. | |
| 2017/0206373 A1 | 7/2017 | Ali et al. | |

(Continued)

OTHER PUBLICATIONS

Dinesh Thakur, "Register—What is Registers? Types of Registers", Mar. 4, 2020, Ecomputer Notes, pp. 1-8, Internet Archive on Mar. 4, 2020 http://web.archive.org/web/20200304045000/http://ecomputernotes.com/fundamental/input-output-and-memory/what-is-registers-function-performed (Year: 2020)*

(Continued)

*Primary Examiner* — Curtis James Kortman
(74) *Attorney, Agent, or Firm* — Holland & Hart LLP

(57) ABSTRACT

Methods, systems, and devices for security techniques for low power state of memory device are described. A host device may initiate a low power state of a memory device. The host device may store a first value of a counter associated with the memory device operating in the low power state and transmit a command to the memory device to enter the low power state. The memory device may increment the counter based on receiving the command and increment the counter to a second value. The host device may validate the memory device based on a difference between the first value of the counter stored by the host device and the second value of the counter.

28 Claims, 8 Drawing Sheets

(56) References Cited

U.S. PATENT DOCUMENTS

| | | | | |
|---|---|---|---|---|
| 2018/0129269 | A1* | 5/2018 | Garg | G06F 9/4418 |
| 2019/0227725 | A1* | 7/2019 | Afriat | G06F 3/0625 |
| 2019/0286823 | A1* | 9/2019 | Walrant | H04L 9/3236 |
| 2022/0171715 | A1* | 6/2022 | Motoyama | G06F 12/1425 |
| 2022/0327244 | A1* | 10/2022 | Benisty | G06F 21/575 |

OTHER PUBLICATIONS

ISA/KR, International Search Report and Written Opinion of the International Searching Authority, Int'l Appl. No. PCT/US2021045412, dated Nov. 29, 2021, Korean Intellectual Property Office, Seo-gu, Daejeon, Republic of Korea, 12pgs.

* cited by examiner

SECURITY TECHNIQUES FOR LOW POWER MODE OF MEMORY DEVICE

CROSS REFERENCE

The present application for patent claims the benefit of U.S. Provisional Patent Application No. 63/068,320 by BOEHM et al., entitled "SECURITY TECHNIQUES FOR LOW POWER MODE OF MEMORY DEVICE," filed Aug. 20, 2020, assigned to the assignee hereof, and expressly incorporated by reference herein.

BACKGROUND

The following relates generally to one or more systems for memory and more specifically to security techniques for low power state of memory device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
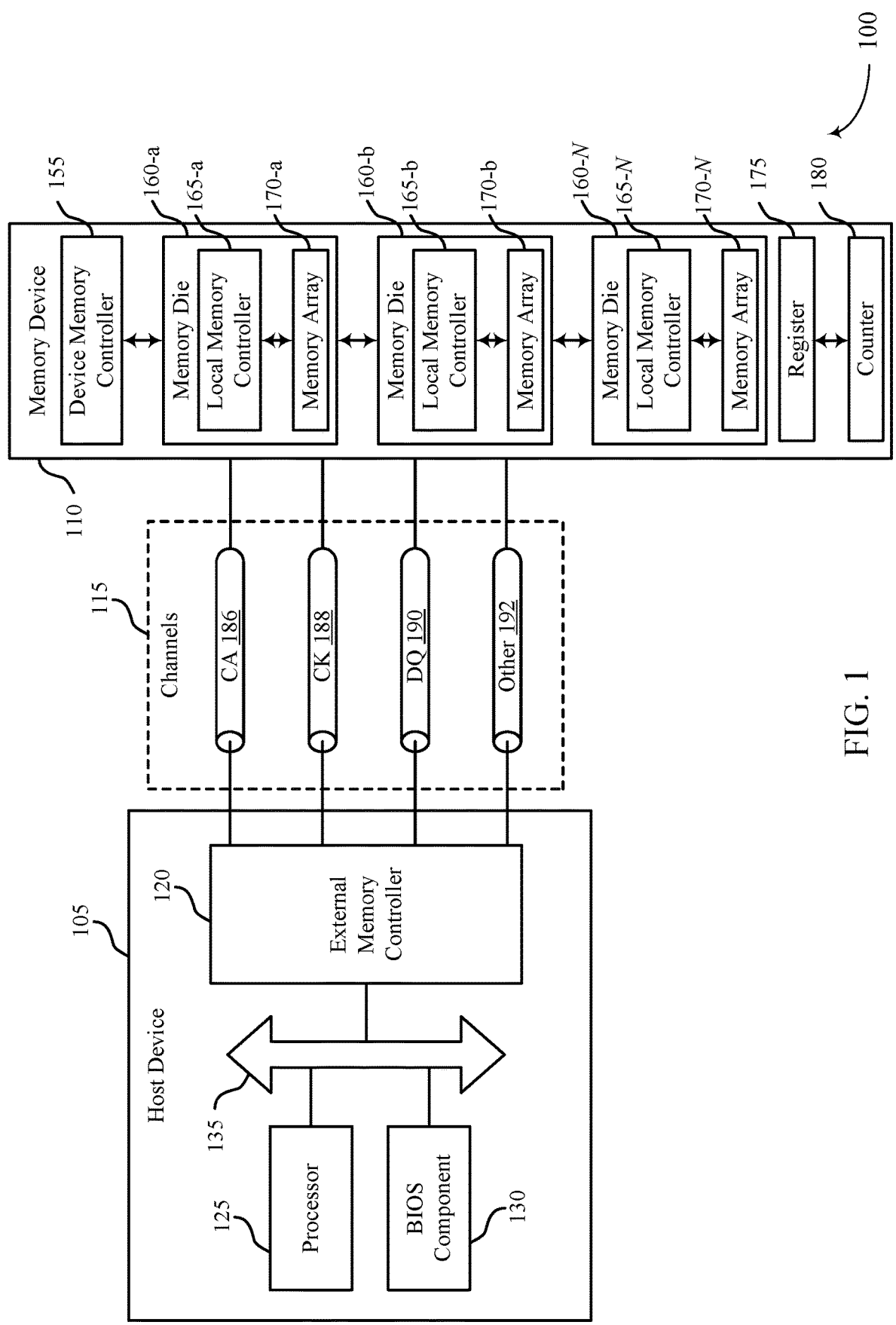
FIG. 1 illustrates an example of a system that supports security techniques for low power state of memory device in accordance with examples as disclosed herein.

A memory system may include a memory device and a host device coupled with the memory device. Some applications, such as vehicle safety systems, autonomous vehicle systems, or other safety systems, may employ a suspend to RAM mode in some applications. For example, when a vehicle system is turned off, the memory device associated with the vehicle system may be placed in a low power state (e.g., suspend to RAM mode or a self-refresh mode). During the low power state, the memory device may conserve power, and retain data. When the memory device exits the low power state, the memory device may experience improved start-up times for components of the vehicle safety systems, autonomous vehicle systems, or other safety systems (e.g., a back-up camera, computer, etc.), thereby increasing the efficiency and overall performance of the system due to the memory device being in a low power mode when the system is shut down.

In some cases, the memory device may be exploited by unauthorized actors during the low power state. For example, an unauthorized user may use commands to cause the memory device to exit the low power mode while the system is shut down, modify the data stored by the memory device, and cause the memory device to re-enter low power mode. In such cases, the system may not be able to determine whether the data of the memory device was modified while the system was shut down and the memory device was in the low power mode. Resuming operations with modified data may increase the risk of hacking and other comprises to the system as a whole, which may have a variety of consequences including theft of information from the system, failure of various sub-systems of the system, ransomware attacks, increasing the power consumption, decreasing the efficiency and start-up time of performing operations, and decreasing the overall performance of the memory device. Such cases may pose a threat to the security and safety of system associated with the memory device.

Systems, devices, and techniques are described to improve security and safety of the memory device operating in a low power mode. A first value of a counter at a first time that the memory device enters a low power mode may be compared with a second value of the counter at a second time that the memory device exits the low power mode. If the difference between the first value and the second value of the counter satisfies a threshold, it may be determined that the memory device was accessed during the low power mode and that one or more aspects of the memory device may be comprised. By using the counter associated with operating in the low power mode, the memory device may decrease an uncertainty associated with determining whether data is modified during the low power mode. In some examples, the reliability of the memory system including the memory device may be increased, thereby allowing the memory device or other components to perform operations at improved speeds, efficiency, and performance.

In some memory systems, security may be improved by checking a self-refresh counter to identify whether an incursion event occurred. For example, the host device may monitor a value of the counter associated with entering the low power mode and a value of the counter associated with exiting the low power mode. The value of the counter associated with entering the low power mode may be incremented based on the memory device operating in low power mode. In some cases, the memory device may write a value associated with exiting the low power state to the counter (e.g., incrementing a value of the counter) to register accessible by the host device. The host device may read the value from the register to determine whether the data of the memory device is modified.

For example, the host device may read the value from a register and determine a difference between the value associated with entering the low power mode stored by the host device and the value associated with exiting the low power state stored by the register. In some cases, the host device may verify that the difference between the value associated with entering the low power mode and the value associated with exiting the low power mode is one. In such cases, the host device may determine that the data is unmodified and validate the memory device. In other examples, the host device may determine that the difference between the value associated with entering the low power state and the value associated with exiting the low power state is greater than one. In such cases, the host device may determine that the data is modified and perform a corrective operation.

Features of the disclosure are initially described in the context of a system as described with reference to FIG. 1. Features of the disclosure are described in the context flow diagrams as described with reference to FIGS. 2-3. These and other features of the disclosure are further illustrated by and described with reference to apparatus diagrams and flowcharts that relate to security techniques for low power mode of memory device as described with reference to FIGS. 4-8.

FIG. 1 illustrates an example of a system 100 that supports security techniques for low power state of memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), a graphics processing unit (GPU), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

The host device 105 may initiate a low power mode for the memory device 110. In such cases, the host device 105 may read a value of a counter 180 of the memory device 110 associated with entering the low power state and store that value. The host device 105 may transmit a command to enter the low power state based on reading and storing that value. The counter 180 may be coupled to a register 175. In some cases, the value of the counter 180 may be stored in the register 175 accessible by both the host device 105 and the memory device 110. The memory device may be configured to write values to the counter 180 based on entering and exiting the low power state. The host device 105 may be configured to read the values of the counter 180. The value of the counter 180 read, by the host device 105, may be stored in a different place than the register 175. For example, the host device 105 may store the value of the counter 180 in a local memory of the host device 105. In some examples, both the host device 105 and the memory device 110 may be configured to both read from and write values to the register 175. In some examples, the host device 105 is configured to read the register 175 (e.g., read-only access) and the memory device 110 is configured to both read from and write to the register 175. In some examples, the register 175 may be included in the memory device 110 and may be coupled to the host device 105. In other examples, the register 175 may be separate from the memory device 110 and coupled between the memory device 110 and the host device 105. In some examples, the register 175 may be included in the host device 105 or in a system that couples the host device 105 and the memory device 110. The register 175 may be a write-only register by the memory device 110. In some cases, the register 175 may be a read-only register for the host device 105. The host device 105 may transmit a command to exit low power state and identify a value of the counter 180 of the memory device 110 exiting the low power state. The host device 105 may validate the memory device 110 based on determining a difference between the first value of the counter 180 stored by the host device 105 on entering the low power mode with the second value of the counter 180 on exiting the low power mode.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a GPU, a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

In some cases, the memory device 110 may receive a command to enter the low power mode. The memory device may increment the counter 180 based on receiving the command. In some examples, the memory device 110 may receive, from the host device 105, a command to exit the low power state. In such cases, the memory device may write the register 175 with a value of the counter 180 after exiting the low power mode.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The techniques described herein may improve a security and safety of the memory device 110 by checking the counter 180 to determine a difference between the value associated with entering the low power state and the value associated with exiting the low power state. Some applications of the techniques described herein may be implemented in vehicle safety systems, autonomous vehicle systems, a computer, a laptop computer, a tablet computer, a smartphone, a cellular phone, a wearable device, an internet-connected device, or other safety systems.

Figure 2:
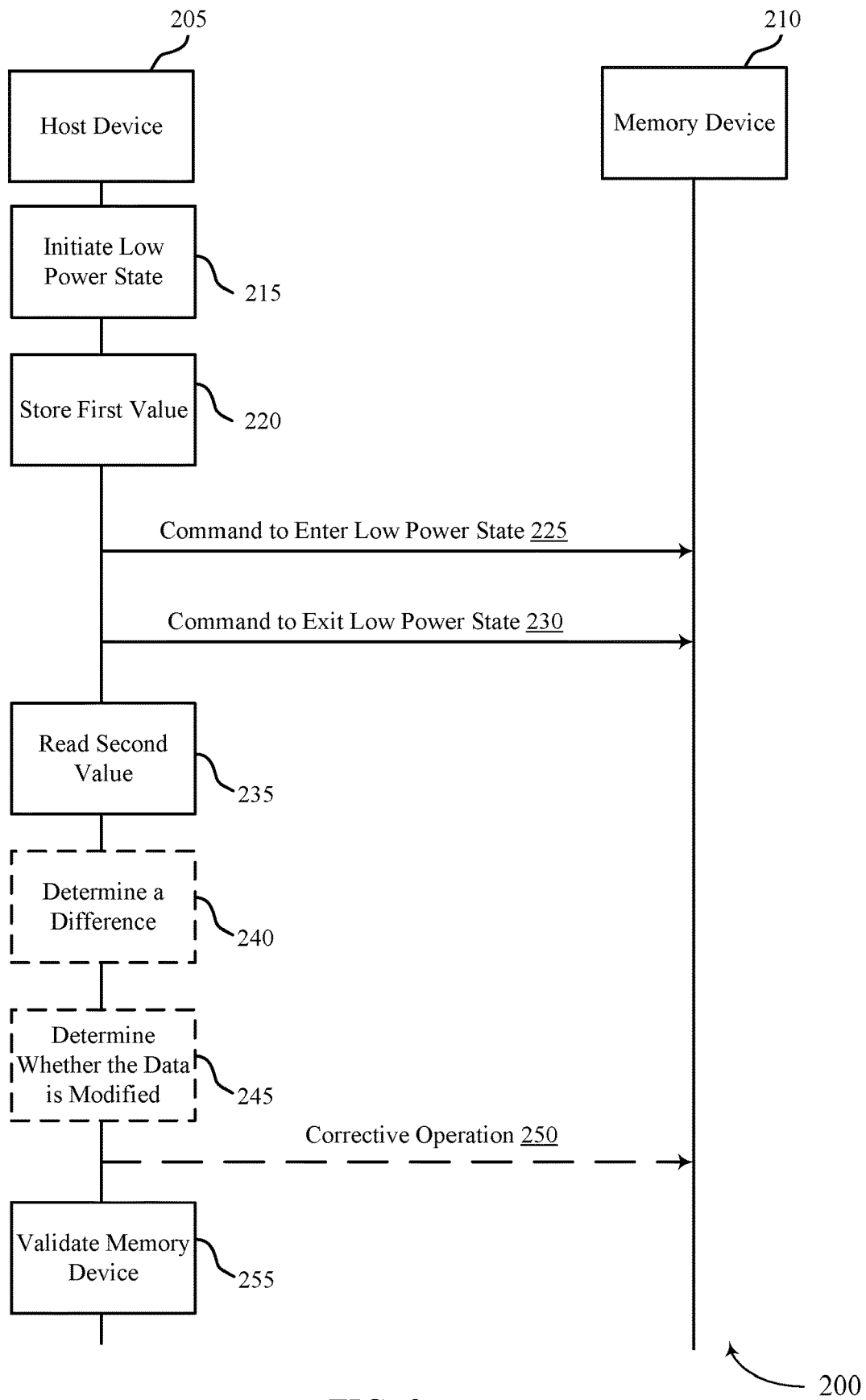
FIG. 2 illustrates an example of a flow diagram that supports security techniques for low power state of memory device in accordance with examples as disclosed herein.

FIG. 2 illustrates an example of a flow diagram 200 that supports security techniques for low power state of memory device in accordance with examples as disclosed herein. Flow diagram 200 may include host device 205 and memory device 210, which may be respective examples of a host device 105 and memory device 110 as described in reference to FIG. 1. Alternative examples of the following may be implemented, where some steps are performed in a different order or not at all. Some steps may additionally include additional features not mentioned below. The flow diagram 200 illustrates techniques where a host device 205 validates whether the memory device 210 has been tampered with during a low power mode.

At 215, the host device 205 may initiate a low power state of the memory device 210. The low power state may be an example of a self-refresh mode. In some cases, the memory device 110 may use an internal counter to maintain (e.g., refresh) data while conserving power during the low power state. In some cases, during a high power state or an operational power state, a host device 205 may initiate refresh operations using one or more refresh commands. To conserve power by reducing signaling between the host device 205 and the memory device 110, the memory device 110 may use a self-refresh mode where internal logic initiates refresh operations. Such an example may be one example of a low power state of the memory device 110. The low power state 110 of the memory device may include other aspects of lower power consumption, as compared with an operation state of the memory device 110.

Prior to the memory device 210 entering the low power state, the host device 205 may read a register that stores a value of a counter associated with entering the low power state (e.g., first value). The register may be an example of the register 175 described with reference to FIG. 1. In some cases, the register may store the value of a counter. At 205, the host device 205 may store the value read from the register in a local memory associated with the host device 205. In some examples, the host device 205 may write the value to the counter of the memory device 210 operating in the low power state.

In some case, the host device 205 may store the value on a first die of the memory device 210, a second die different than the first die of the memory device 210, or a package separate from the memory device 210. For example, the host device 205 may store the value to a nonvolatile register, a separate memory die in the package, or a separate package on a module rather than storing the value to a volatile register.

At 225, the host device 205 may transmit, to the memory device 210, a command to enter the low power state based on writing the value. The memory device 210 may enter the low power state (e.g., self-refresh mode) based on receiving the command. Upon entering the low power state, the memory device 210 may increment the value of the counter and thereby store a new value in the register.

At 230, the host device 205 may transmit a command, to the memory device 210, to exit the low power state. For example, the host device 205 may command the memory device 210 to exit the low power state after a duration of time expires. The memory device 210 may exit the low power state (e.g., self-refresh mode) based on receiving the command. In such cases, the host device 205 may determine that a duration of time expires after issuing the command to enter the low power state and transmit the command to exit the low power state based determining that the duration of time expires.

At 235, the host device 205 may read, from the register, a value of the counter when the memory device 210 exits the low power state (e.g., second value). The host device 205 may identify the value of the counter within the register based on transmitting the command to exit the low power state. In such cases, identifying the value associated with exiting the low power state after the memory device 210 exits the low power state may increase a latency for identifying the value.

At 240, the host device 205 may compare the value of the counter that the host device 205 stored when the memory device 210 entered the low power mode (e.g., the value stored at 220) with the value of the counter when the memory device 210 exits the low power mode (e.g., the value read at 235). For example, the host device 205 may determine a difference between the value associated with entering the low power state and the value associated with exiting the low power state. The host device 205 may determine that the difference between the value associated with entering the low power state and the value associated with exiting the low power state satisfies a threshold. In some examples, the threshold may be a value of one (1). For instance, if the host device 205 stores the value of the register before memory device 210 increments the counter when operating in the low power mode, a difference of one (1) between the two values of the counter may indicate that memory device 110 was not tampered with during the low power mode. In such instances, any differences between the two values that are greater than one (1) (e.g., two or more) may indicate that the memory device 210 exited the low power mode and re-entered the low power mode based on commands from devices other than the host device 205 (e.g., incursion by an unauthorized device).

In other examples, the host device 205 may determine that the difference between the value associated with entering the low power state and the value associated with exiting the low power state is greater than one. In such cases, the host device 205 verifies that the value associated with exiting the low power state is one greater than the value associated with entering the low power state in order to validate the memory device 210. For example, the host device 204 may confirm that the value associated with exiting the low power state is incremented one at a time after operating in the low power state.

At 245, the host device 205 may determine whether the data associated with the memory device 210 is possibly compromised. For example, the host device 205 may determine that the data is unmodified during the low power state based on determining that the difference between the values satisfies a threshold (e.g., a threshold value of one). In other examples, the host device 205 may determine that data may be have been modified during the low power state based on determining that the difference between the values does not satisfy the threshold (e.g., the difference is greater than one). In such examples, the host device 205 may determine that the memory device 210 has been accessed by an unauthorized device while operating in the low power mode, which may indicate that at least some data may have been compromised.

In such cases, at 250, the host device 205 may perform a corrective operation. For example, the host device 205 may transmit a command to execute the corrective operation based on determining that the data associated with the memory device is modified. The corrective operation may include rewriting data back into the memory device that is more likely to be untampered with by an unauthorized device. In some examples, the corrective operation may include transmitting a command to the memory device 210 to perform a series of previously commanded actions that results in data that occurred before entering the low power state to be stored back into the memory.

At 255, the host device 205 may validate the memory device 210 based on determining that the difference between the values satisfies the threshold. In other examples, the host device 205 may validate the memory device 210 based on performing the corrective operation. For example, the validation may determine whether the memory device 210 was maliciously taken out of the low power state (e.g., low power state) and modified. In some cases, the host device 205 may determine whether one or more registers configured to store a value of the counter are erased as part of a reset command. In such cases, the host device 205 may validate the memory device 210 based on determining whether the one or more registers are erased.

Figure 3:
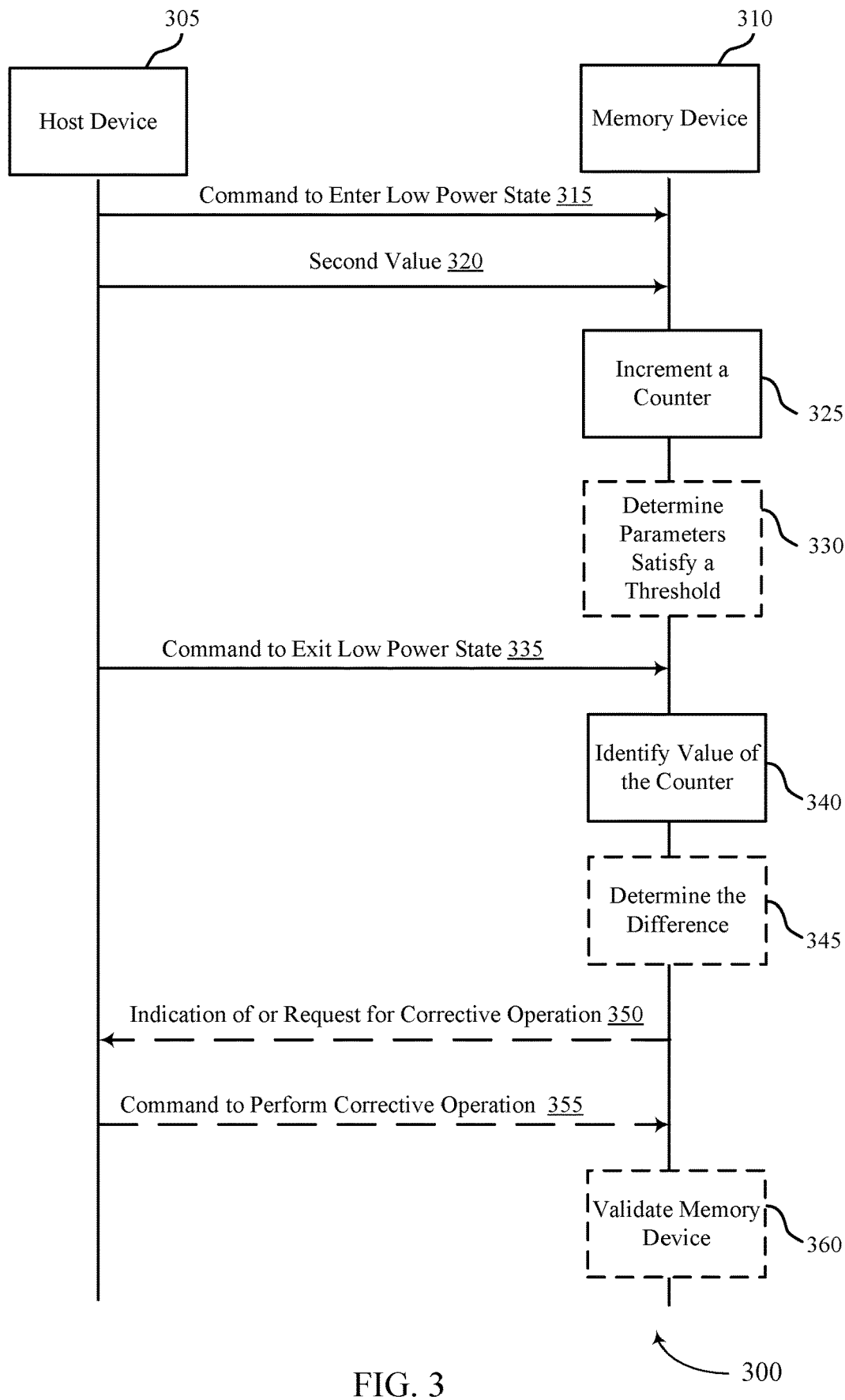
FIG. 3 illustrates an example of a flow diagram that supports security techniques for low power state of memory device in accordance with examples as disclosed herein.

FIG. 3 illustrates an example of a flow diagram 300 that supports security techniques for low power state of memory device in accordance with examples as disclosed herein. Flow diagram 300 may include host device 305 and memory device 310, which may be respective examples of a host device and memory device as described in reference to FIGS. 1 and 2. Alternative examples of the following may be implemented, where some steps are performed in a different order or not at all. Some steps may additionally include additional features not mentioned below. The flow diagram 300 illustrates techniques where a memory device 310 validates whether it has been tampered with during a low power mode.

At 315, the memory device 310 may receive, from the host device 305, a command to enter a low power state. Prior to transmitting the command, the host device 305 may read a register that stores a value of a counter associated with entering the low power state (e.g., first value). The register may be an example of the register described with reference to FIGS. 1-2. In some cases, the register may store the value of a counter. At 320, the memory device 310 may receive, from the host device 305, a value of the counter identified by the host device 305. For example, the memory device 310 may receive a value associated with entering the low power state. The value received from the host device 305 may be used by the memory device 310 to validate whether it was tampered with when it exits the low power mode. The memory device 310 store the value received from the host device 305 in a location different than the register. The memory device 310 may enter the low power state.

At 325, the memory device 310 may increment the counter associated with the memory device 310 operating in the low power state. The value of the counter may be stored in a register. The memory device 310 may increase a value of the counter by one value based on entering the low power state. In some examples, the memory device 310 may determine a sequence of self-refresh commands for read operations and write operations rather than incrementing the counter or in addition to incrementing the counter. The memory device 310 may receive a command after entering the low power state to initiate the memory device 310 to increment the counter.

During a suspend to RAM exploit operation (e.g., incursion event), the memory device 310 may be cooled to ensure data retention in the memory array. The memory device 310 may be removed from the system, installed in an alternate system to modify the data, and then reinserted into the system. In such cases, parameters of the memory device 310 may be monitored to determine if an incursion event occurred.

At 330, the memory device 310 may determine that parameters associated with the memory device 310 satisfy a threshold. For example, the memory device 310 may monitor the voltage of the memory device 310 and store a value of the voltage in a non-volatile memory register based on determining that the value is below a threshold or determining a rate of a voltage drop. The voltage (e.g., threshold voltage) may indicate whether power is removed from the memory device 310. In some cases, the memory device 310 may set a flag to indicate that the power parameter satisfies the threshold and determine whether an incursion event occurred.

In such cases, the memory device 310 may determine that a power parameter of the memory device 310 satisfies a threshold during at least a portion that the memory device 310 is operating in the low power state. The memory device 310 may write a value of the counter associated with entering the low power state, a value of the counter associated with exiting the low power state, or both in a non-volatile memory based on determining that the power parameter satisfies the threshold.

In some examples, the memory device 310 may monitor the temperature of the memory device 310 and detect whether the temperature of the memory device 310 is in the super cooling range. The super cooling range may be a range of temperatures below zero. In some case, the memory device 310 may store a value of the temperature in a non-volatile register. In some cases, the memory device 310 may set a flag to indicate that the temperature parameter satisfies the threshold and determine whether an incursion event occurred.

For example, the memory device 310 may determine that a temperature parameter of the memory device 310 satisfies a threshold during at least a portion that the memory device 310 is operating in the low power state. In such cases, the memory device 310 may write a value of the counter associated with entering the low power state, a value of the counter associated with exiting the low power state, or both in a non-volatile memory based on determining that the temperature parameter satisfies the threshold.

At 335, the memory device 310 may receive a command to exit the low power state. In such cases, the memory device 310 may exit the low power state. At 340, the memory device 310 may identify a value of the counter (e.g., read the value of the register). If the memory device 310 was pulled out of the low power mode by an unauthorized user, the difference between the value received from the host device 305 (e.g., received at 320) and the value of the register (e.g., identified at 340) may not satisfy a threshold. In some cases, the memory device 310 may receive, from the host device 305, the value associated with operating in the low power mode (e.g., the value communicated at 320). In such cases, the host device 305 may transmit an indication of the stored value of the counter for the memory device 310 to perform the validation.

At 345, the memory device 310 may determine a difference between the value received from the host device 305 and the value of the counter at the time of exiting the low power mode. In such cases, the memory device 310 may compare the value received from the host device 305 with the current value of the counter of the memory device 310 (e.g., the value associated with exiting the low power state). In such cases, the memory device 310 may determine that the difference between the values satisfies a threshold. Any expected difference and threshold may be used to make the determination about tampering. For example, the memory device 310 may be validated if the difference is zero (e.g., the threshold is zero). In other examples, the memory device 310 may be validated if the difference is one (e.g., the threshold is one). In some cases, the received value may match the current value of the counter of the memory device 310. The memory device 310 may be validated based on determining that the values match (e.g., that the difference is zero). In some cases, the memory device 310 may determine that the difference between the received value and the current value of the counter is greater than zero. In such cases, the memory device 310 may refrain from validating the memory device 310.

In other examples, the memory device 310 may compare the received value associated with entering the low power state with the incremented value of the counter (e.g., the value associated with exiting the low power state). For example, the memory device 310 may determine that the difference between the value associated with entering the low power state and the incremented value is one. The memory device 310 may be validated based on determining that the difference is one.

In some cases, the memory device 310 may determine that the difference between the value associated with entering the low power state and the incremented value of the counter is greater than one. In such cases, the memory device 310 may refrain from validating the memory device 310. At 350, the memory device 310 may transmit, to the host device 305, an indication of a corrective operation, a request to perform a corrective operation, or an indication that an incursion may have occurred. For example, the memory device 310 may perform a corrective operation based on determining that the difference between the received value associated with exiting the low power state and the incremented value is greater than zero. In other examples, the memory device 310 may transmit an indication of a corrective operation based on determining that the difference between the received value associated with entering the low power state and the incremented value is greater than one. In some cases, indication or request may be transmitted based on the difference between values not satisfying a threshold or one of the other incursion events occurring. For example, the memory device 310 may transmit the indication or request based on one or more temperature parameters or one or more power parameters satisfying one or more thresholds while the memory device 310 was operating in the low power mode.

In some examples, the memory device 310 may determine whether one or more registers (e.g., registers that are configured to store a value of the counter) are erased as part of a reset command. For example, validating the memory device 310 may be based on determining whether the one or more registers are erased. As the reset command clears register space, the memory device 310 may monitor a reset indicator to increase the security of the memory device 310. In such cases, the memory device 310 may transmit the indication or request based on determining that one or more registers are erased or reset while the memory device 310 operates in the low power mode.

At 355, the memory device 310 may receive, from the host device 305, an command to perform one or more corrective actions based on transmitting a request to perform a corrective operation, or an indication that an incursion may have occurred. The memory device 310 may perform the corrective operations.

At 360, the memory device 310 may be validated. The memory device 310 may be validated based on a difference between the value of the counter associated with exiting the low power state and a value satisfying a threshold received from the host device 305. In such cases, the memory device 310 may be validated based on determining that the difference is zero or one. In some cases, the memory device 310 may be validated after exiting the low power state.

Figure 4:
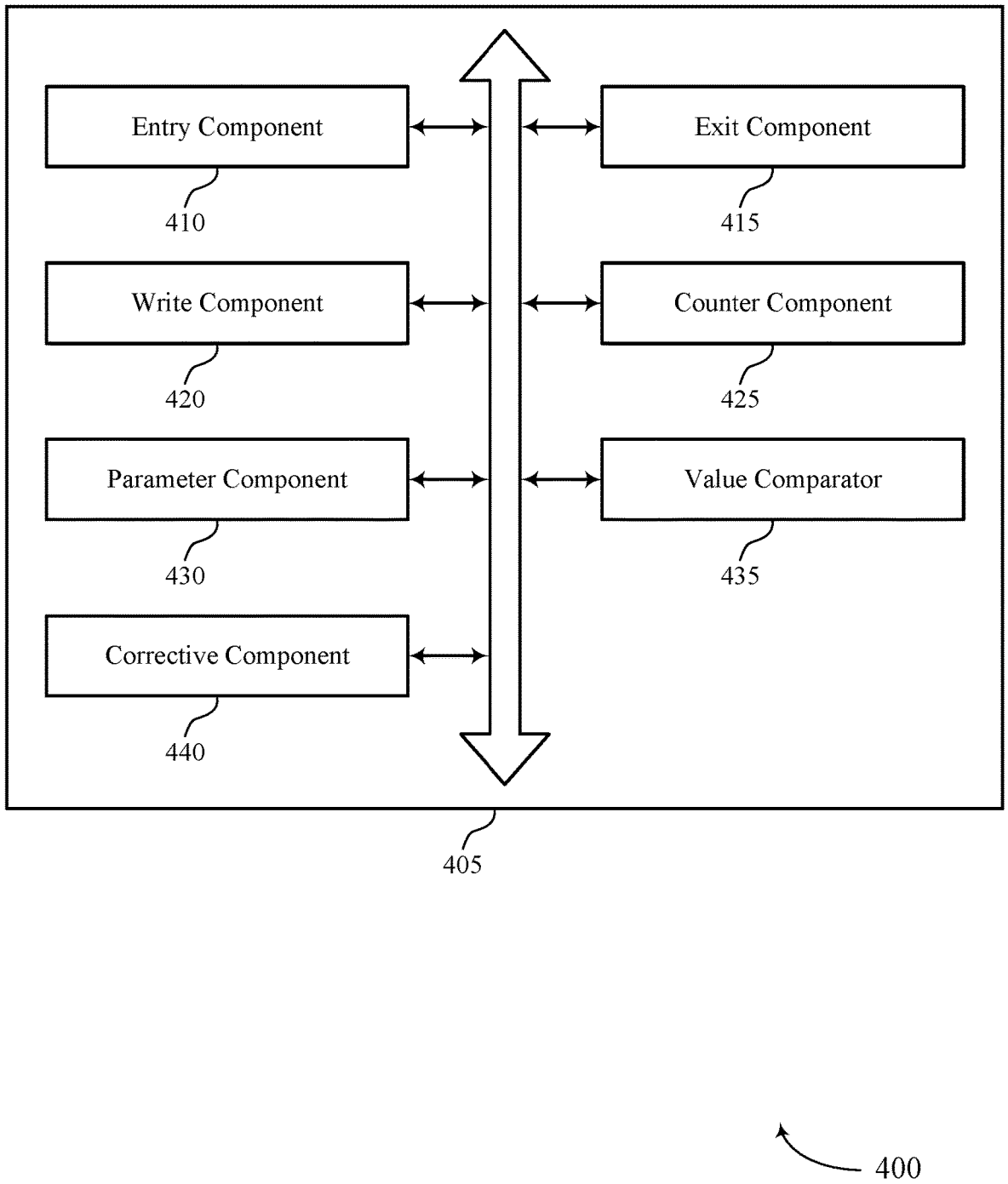
FIG. 4 shows a block diagram of a memory device that supports security techniques for low power state of memory device in accordance with examples as disclosed herein.

FIG. 4 shows a block diagram 400 of a memory device 405 that supports security techniques for low power state of memory device in accordance with examples as disclosed herein. The memory device 405 may be an example of aspects of a memory device as described with reference to FIGS. 1 through 3. The memory device 405 may include an entry component 410, an exit component 415, a write component 420, a counter component 425, a parameter component 430, a value comparator 435, and a corrective component 440. Each of these modules may communicate, directly or indirectly, with one another (e.g., via one or more buses).

The entry component 410 may receive, from a host device by a memory device, a first command to enter a low power state.

The exit component 415 may receive, from the host device, a second command to exit the low power state.

The write component 420 may write a mode register of the memory device with a value of the counter based on receiving the second command to exit the low power state. In some examples, the write component 420 may perform a write operation based on receiving the second command, where writing the mode register of the memory device with the value of the counter is based on performing the write operation, and where receiving the second command is based on incrementing the counter.

In some examples, the write component 420 may write a first value of the counter associated with entering the low power state, a second value of the counter associated with exiting the low power state, or both in a non-volatile memory based on determining that the power parameter satisfies the threshold. In some examples, the write component 420 may write a first value of the counter associated with entering the low power state, a second value of the counter associated with exiting the low power state, or both in a non-volatile memory based on determining that the temperature parameter satisfies the threshold.

The counter component 425 may increment a counter of the memory device operating in the low power state based on receiving the first command to enter the low power state. In some examples, the counter component 425 may receive, from the host device, a second value of the counter stored by the host device based on receiving the first command.

The parameter component 430 may determine that a power parameter of the memory device satisfies a threshold during at least a portion that the memory device is operating in the low power state. In some examples, the parameter component 430 may determine that a temperature parameter of the memory device satisfies a threshold during at least a portion that the memory device is operating in the low power state.

The value comparator 435 may receive, from the host device, an indication that the memory device is validated based on a difference between a first value of the counter associated with entering the low power state and a second value of the counter associated with exiting the low power state. In some examples, the value comparator 435 may validate, after exiting the low power state, the memory device based on a difference between the value of the counter associated with exiting the low power state and the second value satisfying a threshold received from the host device.

In some examples, the value comparator 435 may compare the value with the second based on receiving the second value. In some examples, the value comparator 435 may determine that the difference between the value and the second value is zero or one based on comparing the value with the second value, where validating the memory device is based on determining that the value and the second value is zero or one. In some examples, the value comparator 435 may determine that the difference between the value and the second value is greater than one based on comparing the value with the second value.

The corrective component 440 may perform a corrective operation based on determining that the difference between the value and the second value is greater than one. In some examples, the corrective component 440 may transmit, to the host device, an indication of the corrective operation based on performing the corrective operation.

Figure 5:
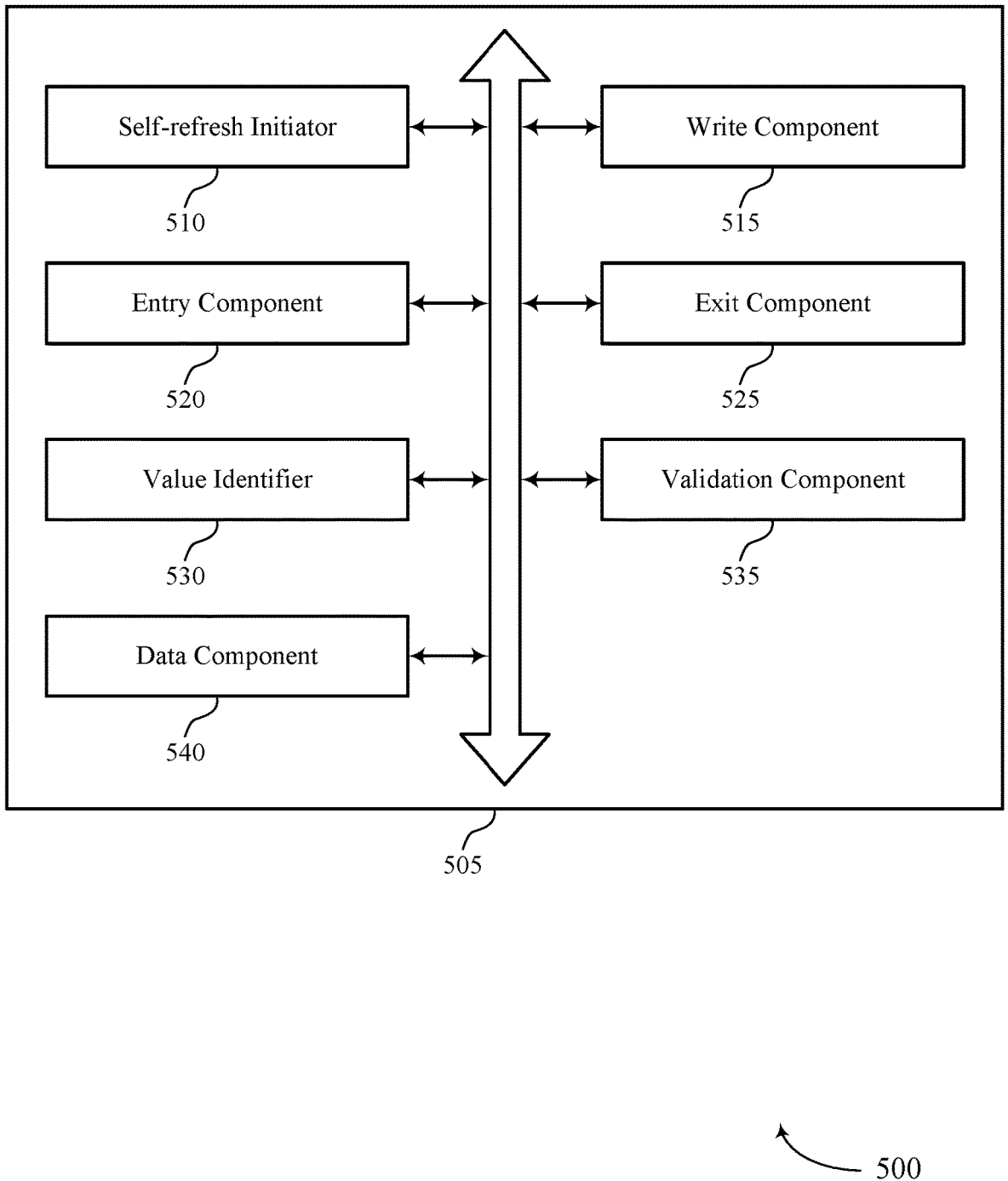
FIG. 5 shows a block diagram of a host device that supports security techniques for low power state of memory device in accordance with examples as disclosed herein.

FIG. 5 shows a block diagram 500 of a host device 505 that supports security techniques for low power state of memory device in accordance with examples as disclosed herein. The host device 505 may be an example of aspects of a host device as described with reference to FIGS. 1 through 3. The host device 505 may include a self-refresh initiator 510, a write component 515, an entry component 520, an exit component 525, a value identifier 530, a validation component 535, and a data component 540. Each of these modules may communicate, directly or indirectly, with one another (e.g., via one or more buses).

The self-refresh initiator 510 may initiate a low power state of a memory device.

The write component 515 may write a first value of a counter of the memory device operating in the low power state based on initiating the low power state. In some examples, the write component 515 may determine the first value associated with entering the low power state based on initiating the low power state, where writing the first value is based on determining the first value.

The entry component 520 may transmit a first command to enter the low power state based on the first value. In some examples, the entry component 520 may transmit, to the memory device, a third value of the counter stored by a host device based on transmitting the first command. In some examples, the entry component 520 may determine that a duration of time expires after issuing the first command to enter the low power state, where transmitting the second command to exit the low power state is based on determining that the duration of time expires.

The exit component 525 may transmit a second command to exit the low power state based on the first value.

The value identifier 530 may identify a second value of the counter based on transmitting the second command. In some examples, the value identifier 530 may determine the difference between the first value and the second value based on identifying the second value, where validating the memory device is based on determining the difference.

In some examples, the value identifier 530 may determine that the difference between the first value and the second value is one based on identifying the second value, where validating the memory device is based on determining that the difference is one. In some examples, the value identifier 530 may determine that the difference between the first value and the second value is greater than one based on identifying the second value, where validating the memory device further includes performing a corrective operation based on determining that the difference is greater than one.

The validation component 535 may validate the memory device based on a difference between the first value and the second value.

The data component 540 may determine that data associated with the memory device is unmodified during the low power state based on determining that the difference is one. In some examples, the data component 540 may determine that data associated with the memory device is modified during the low power state based on determining that the difference is greater than one. In some examples, the data component 540 may transmit a third command to execute the corrective operation based on determining that the associated with the memory device is modified.

Figure 6:
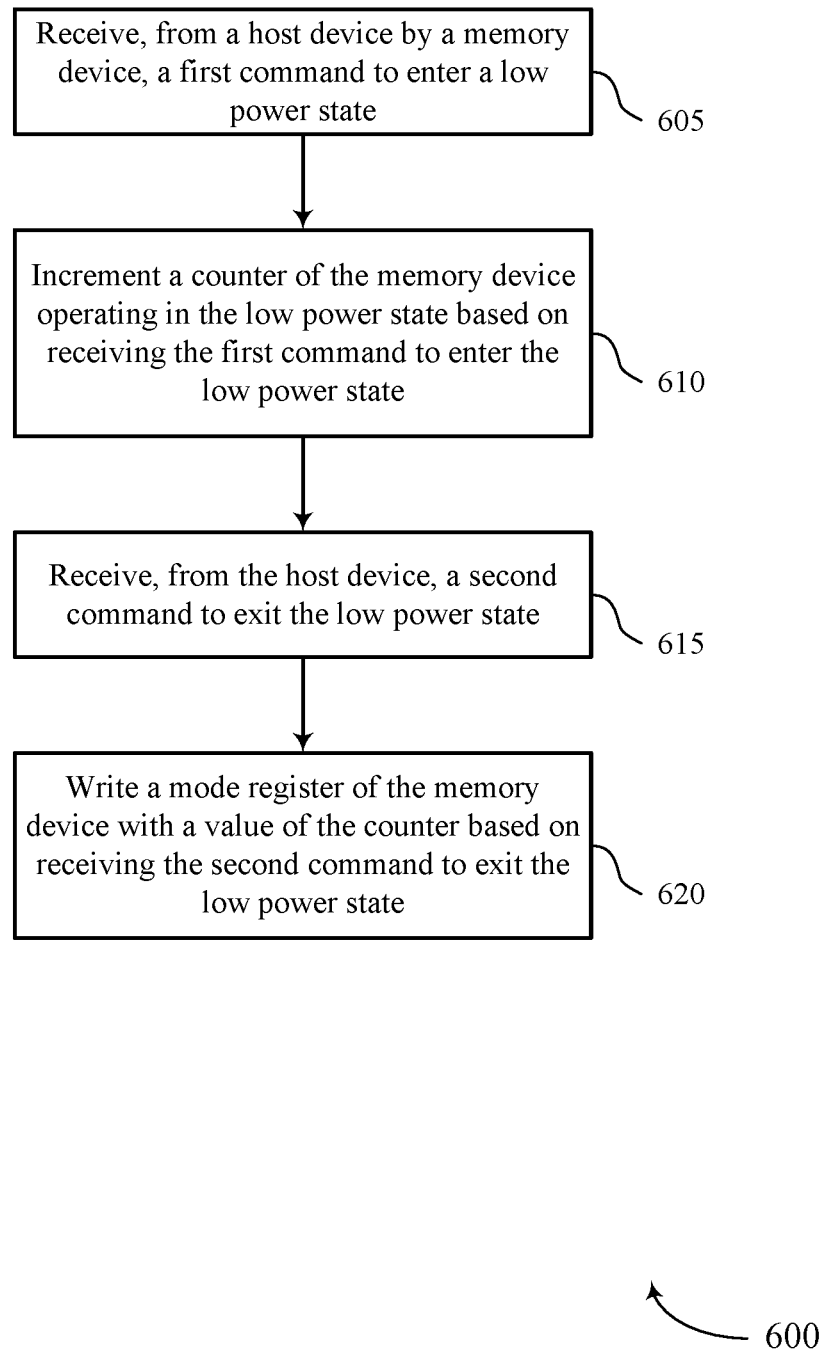
FIGS. 6 through 8 show flowcharts illustrating a method or methods that support security techniques for low power state of memory device in accordance with examples as disclosed herein.

FIG. 6 shows a flowchart illustrating a method or methods 600 that supports security techniques for low power state of memory device in accordance with examples as disclosed herein. The operations of method 600 may be implemented by a memory device or its components as described herein. For example, the operations of method 600 may be performed by a memory device as described with reference to FIG. 4. In some examples, a memory device may execute a set of instructions to control the functional elements of the memory device to perform the described functions. Additionally or alternatively, a memory device may perform aspects of the described functions using special-purpose hardware.

At 605, the memory device may receive, from a host device by a memory device, a first command to enter a low power state. The operations of 605 may be performed according to the methods described with reference to FIG. 3. In some examples, aspects of the operations of 605 may be performed by an entry component as described with reference to FIG. 4.

At 610, the memory device may increment a counter of the memory device operating in the low power state based on receiving the first command to enter the low power state. The operations of 610 may be performed according to the methods described with reference to FIG. 3. In some examples, aspects of the operations of 610 may be performed by a counter component as described with reference to FIG. 4.

At 615, the memory device may receive, from the host device, a second command to exit the low power state. The operations of 615 may be performed according to the methods described with reference to FIG. 3. In some examples, aspects of the operations of 615 may be performed by an exit component as described with reference to FIG. 4.

At 620, the memory device may write a mode register of the memory device with a value of the counter based on receiving the second command to exit the low power state. The operations of 620 may be performed according to the methods described with reference to FIG. 3. In some examples, aspects of the operations of 620 may be performed by a write component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for receiving, from a host device by a memory device, a first command to enter a low power state, incrementing a counter of the memory device operating in the low power state based on receiving the first command to enter the low power state, receiving, from the host device, a second command to exit the low power state, and writing a mode register of the memory device with a value of the counter based on receiving the second command to exit the low power state.

Some examples of the method 600 and the apparatus described herein may further include operations, features, means, or instructions for receiving, from the host device, an indication that the memory device may be validated based on a difference between a first value of the counter associated with entering the low power state and a second value of the counter associated with exiting the low power state.

Some examples of the method 600 and the apparatus described herein may further include operations, features, means, or instructions for receiving, from the host device, a second value of the counter stored by the host device based on receiving the first command, and validating, after exiting the low power state, the memory device based on a difference between the value of the counter associated with exiting the low power state and the second value satisfying a threshold received from the host device.

Some examples of the method 600 and the apparatus described herein may further include operations, features, means, or instructions for comparing the value with the second based on receiving the second value.

Some examples of the method 600 and the apparatus described herein may further include operations, features, means, or instructions for determining that the difference between the value and the second value may be zero or one based on comparing the value with the second value, where validating the memory device may be based on determining that the value and the second value may be zero or one.

Some examples of the method 600 and the apparatus described herein may further include operations, features, means, or instructions for determining that the difference between the value and the second value may be greater than one based on comparing the value with the second value, and performing a corrective operation based on determining that the difference between the value and the second value may be greater than one.

Some examples of the method 600 and the apparatus described herein may further include operations, features, means, or instructions for transmitting, to the host device, an indication of the corrective operation based on performing the corrective operation.

Some examples of the method 600 and the apparatus described herein may further include operations, features, means, or instructions for performing a write operation based on receiving the second command, where writing the mode register of the memory device with the value of the counter may be based on performing the write operation, and where receiving the second command may be based on incrementing the counter.

Some examples of the method 600 and the apparatus described herein may further include operations, features, means, or instructions for determining that a power parameter of the memory device satisfies a threshold during at least a portion that the memory device may be operating in the low power state, and writing a first value of the counter associated with entering the low power state, a second value of the counter associated with exiting the low power state, or both in a non-volatile memory based on determining that the power parameter satisfies the threshold.

Some examples of the method 600 and the apparatus described herein may further include operations, features, means, or instructions for determining that a temperature parameter of the memory device satisfies a threshold during at least a portion that the memory device may be operating in the low power state, and writing a first value of the counter associated with entering the low power state, a second value of the counter associated with exiting the low power state, or both in a non-volatile memory based on determining that the temperature parameter satisfies the threshold.

Figure 7:
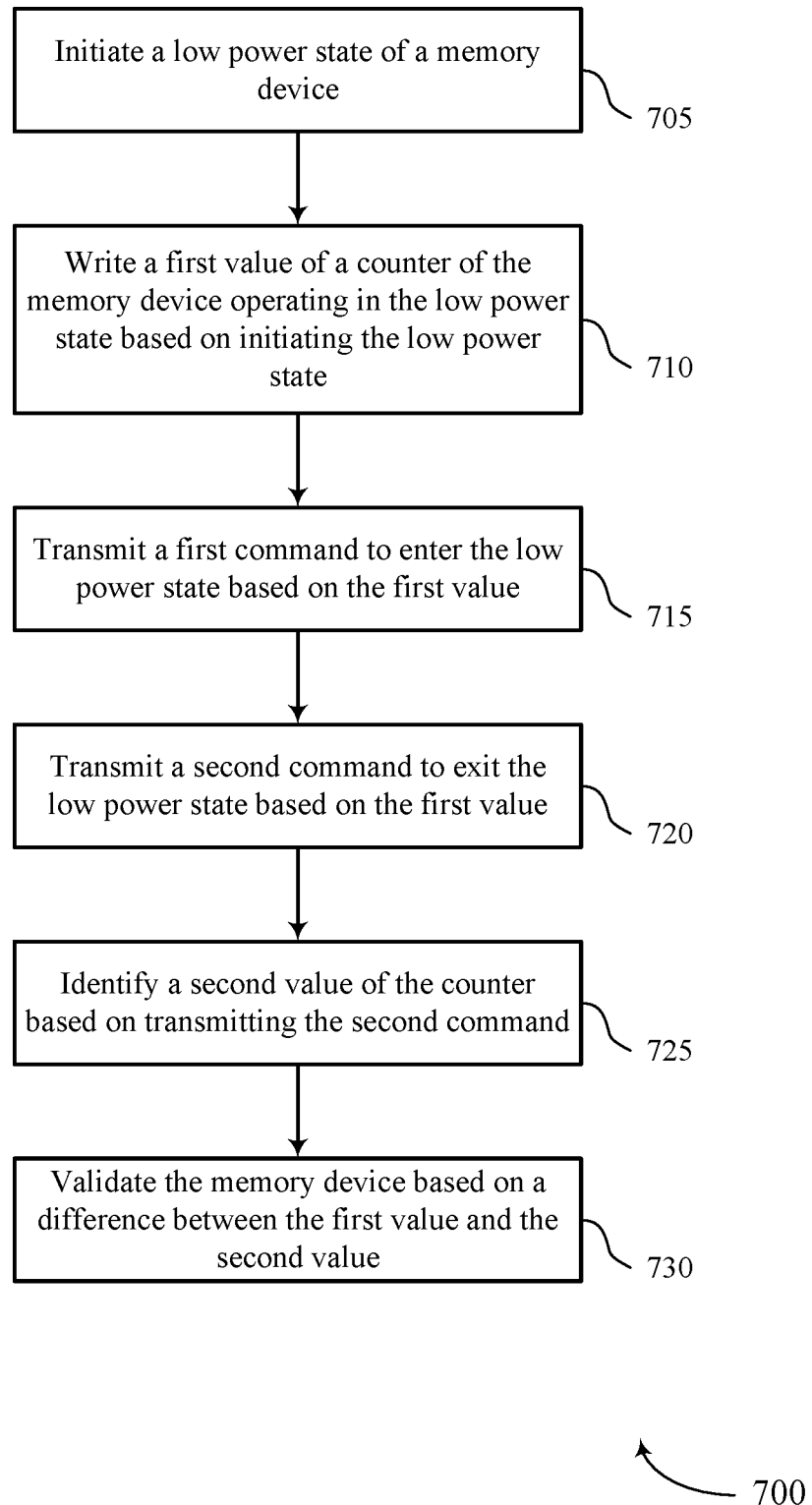

FIG. 7 shows a flowchart illustrating a method or methods 700 that supports security techniques for low power state of memory device in accordance with examples as disclosed herein. The operations of method 700 may be implemented by a host device or its components as described herein. For example, the operations of method 700 may be performed by a host device as described with reference to FIG. 5. In some examples, a host device may execute a set of instructions to control the functional elements of the host device to perform the described functions. Additionally or alternatively, a host device may perform aspects of the described functions using special-purpose hardware.

At 705, the host device may initiate a low power state of a memory device. The operations of 705 may be performed according to the methods described with reference to FIG. 2. In some examples, aspects of the operations of 705 may be performed by a self-refresh initiator as described with reference to FIG. 5.

At 710, the host device may write a first value of a counter of the memory device operating in the low power state based on initiating the low power state. The operations of 710 may be performed according to the methods described with reference to FIG. 2. In some examples, aspects of the operations of 710 may be performed by a write component as described with reference to FIG. 5.

At 715, the host device may transmit a first command to enter the low power state based on the first value. The operations of 715 may be performed according to the methods described with reference to FIG. 2. In some examples, aspects of the operations of 715 may be performed by an entry component as described with reference to FIG. 5.

At 720, the host device may transmit a second command to exit the low power state based on the first value. The operations of 720 may be performed according to the methods described with reference to FIG. 2. In some examples, aspects of the operations of 720 may be performed by an exit component as described with reference to FIG. 5.

At 725, the host device may identify a second value of the counter based on transmitting the second command. The operations of 725 may be performed according to the methods described with reference to FIG. 2. In some examples, aspects of the operations of 725 may be performed by a value identifier as described with reference to FIG. 5.

At 730, the host device may validate the memory device based on a difference between the first value and the second value. The operations of 730 may be performed according to the methods described with reference to FIG. 2. In some examples, aspects of the operations of 730 may be performed by a validation component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for initiating a low power state of a memory device, writing a first value of a counter of the memory device operating in the low power state based on initiating the low power state, transmitting a first command to enter the low power state based on the first value, transmitting a second command to exit the low power state based on the first value, identifying a second value of the counter based on transmitting the second command, and validating the memory device based on a difference between the first value and the second value.

Some examples of the method 700 and the apparatus described herein may further include operations, features, means, or instructions for determining the difference between the first value and the second value based on identifying the second value, where validating the memory device may be based on determining the difference.

Some examples of the method 700 and the apparatus described herein may further include operations, features, means, or instructions for determining that the difference between the first value and the second value may be one based on identifying the second value, where validating the memory device may be based on determining that the difference may be one.

Some examples of the method 700 and the apparatus described herein may further include operations, features, means, or instructions for determining that data associated with the memory device may be unmodified during the low power state based on determining that the difference may be one.

Some examples of the method 700 and the apparatus described herein may further include operations, features, means, or instructions for determining that the difference between the first value and the second value may be greater than one based on identifying the second value, where validating the memory device further includes performing a corrective operation based on determining that the difference may be greater than one.

Some examples of the method 700 and the apparatus described herein may further include operations, features, means, or instructions for determining that data associated with the memory device may be modified during the low power state based on determining that the difference may be greater than one.

Some examples of the method 700 and the apparatus described herein may further include operations, features, means, or instructions for transmitting a third command to execute the corrective operation based on determining that the associated with the memory device may be modified.

Some examples of the method 700 and the apparatus described herein may further include operations, features, means, or instructions for determining the first value associated with entering the low power state based on initiating the low power state, where writing the first value may be based on determining the first value.

Some examples of the method 700 and the apparatus described herein may further include operations, features, means, or instructions for transmitting, to the memory device, a third value of the counter stored by a host device based on transmitting the first command.

Some examples of the method 700 and the apparatus described herein may further include operations, features, means, or instructions for determining that a duration of time expires after issuing the first command to enter the low power state, where transmitting the second command to exit the low power state may be based on determining that the duration of time expires.

Figure 8:
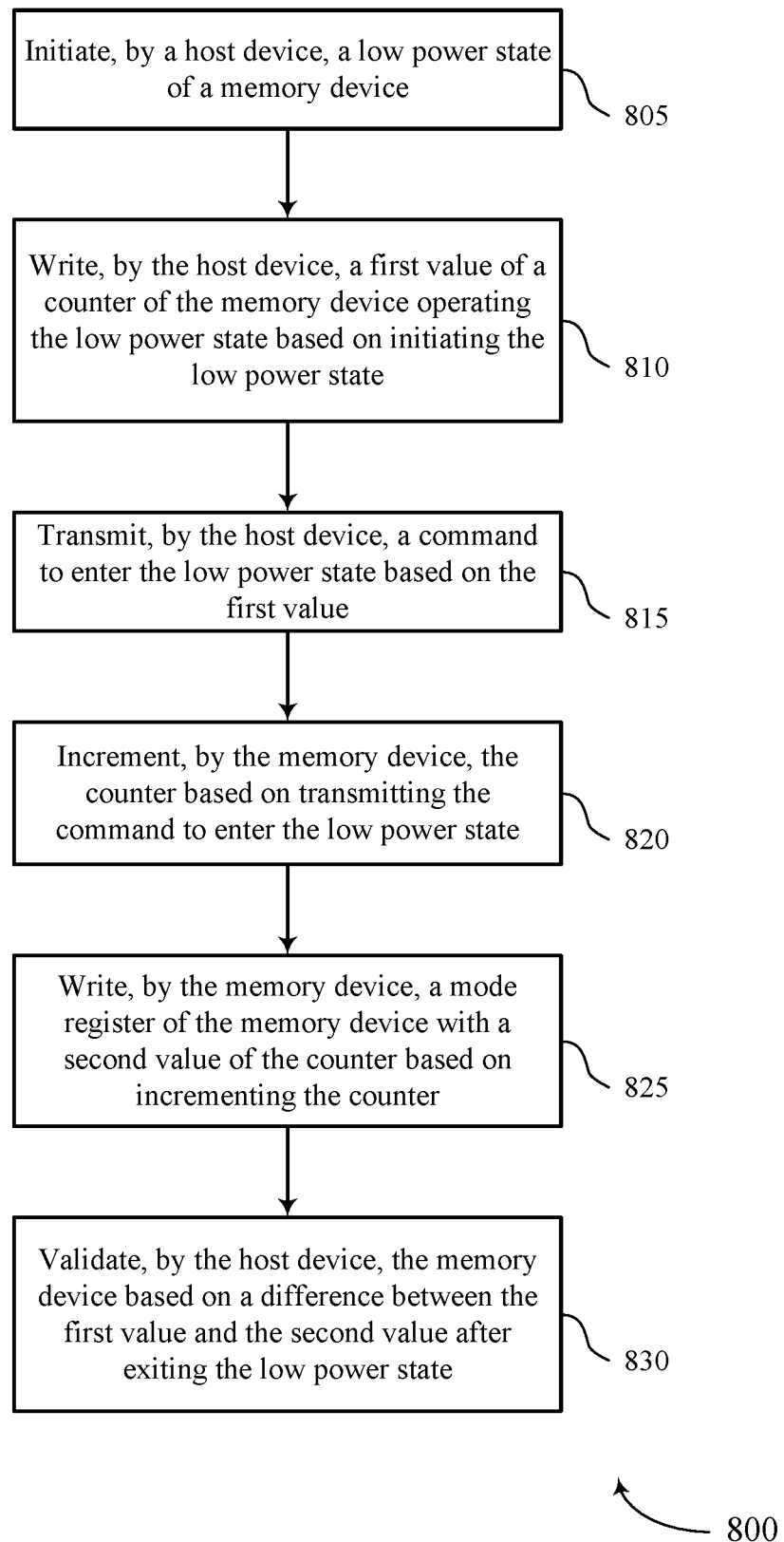

FIG. 8 shows a flowchart illustrating a method or methods 800 that supports security techniques for low power state of memory device in accordance with examples as disclosed herein. The operations of method 800 may be implemented by a memory system or its components as described herein. For example, the operations of method 800 may be performed by a memory device or host device as described with reference to FIGS. 4 and 5. In some examples, a memory system may execute a set of instructions to control the functional elements of the memory system to perform the described functions. Additionally or alternatively, a memory system may perform aspects of the described functions using special-purpose hardware.

At 805, the memory system may initiate, by a host device, a low power state of a memory device. The operations of 805 may be performed according to the methods described herein. In some examples, aspects of the operations of 805 may be performed by a self-refresh initiator as described with reference to FIG. 5.

At 810, the memory system may write, by the host device, a first value of a counter of the memory device operating the low power state based on initiating the low power state. The operations of 810 may be performed according to the methods described herein. In some examples, aspects of the operations of 810 may be performed by a write component as described with reference to FIG. 5.

At 815, the memory system may transmit, by the host device, a command to enter the low power state based on the first value. The operations of 815 may be performed according to the methods described herein. In some examples, aspects of the operations of 815 may be performed by an entry component as described with reference to FIG. 5.

At 820, the memory system may increment, by the memory device, the counter based on transmitting the command to enter the low power state. The operations of 820 may be performed according to the methods described herein. In some examples, aspects of the operations of 820 may be performed by a counter component as described with reference to FIG. 4.

At 825, the memory system may write, by the memory device, a mode register of the memory device with a second value of the counter based on incrementing the counter. The operations of 825 may be performed according to the methods described herein. In some examples, aspects of the operations of 825 may be performed by a write component as described with reference to FIG. 4.

At 830, the memory system may validate, by the host device, the memory device based on a difference between the first value and the second value after exiting the low power state. The operations of 830 may be performed according to the methods described herein. In some examples, aspects of the operations of 830 may be performed by a validation component as described with reference to FIG. 5.

In some examples, an apparatus as described herein may perform a method or methods, such as the method 800. The apparatus may include features, means, or instructions (e.g., a non-transitory computer-readable medium storing instructions executable by a processor) for initiating, by a host device, a low power state of a memory device, writing, by the host device, a first value of a counter of the memory device operating the low power state based on initiating the low power state, transmitting, by the host device, a command to enter the low power state based on the first value, incrementing, by the memory device, the counter based on transmitting the command to enter the low power state, writing, by the memory device, a mode register of the memory device with a second value of the counter based on incrementing the counter, and validating, by the host device, the memory device based on a difference between the first value and the second value after exiting the low power state.

Some examples of the method 800 and the apparatus described herein may further include operations, features, means, or instructions for determining that the difference between the first value and the second value may be one based on writing the mode register of the memory device with the second value of the counter, where validating the memory device may be based on determining that the difference may be one.

Some examples of the method 800 and the apparatus described herein may further include operations, features, means, or instructions for determining that data associated the memory device may be unmodified during the low power state based on determining that the difference may be one.

Some examples of the method 800 and the apparatus described herein may further include operations, features, means, or instructions for determining that the difference between the first value and the second value may be greater than one based on writing the mode register of the memory device with the second value of the counter, where validating the memory device further includes performing a corrective operation based on determining that the difference may be greater than one.

Some examples of the method 800 and the apparatus described herein may further include operations, features, means, or instructions for determining that data associated the memory device may be modified during the low power state based on determining that the difference may be greater than one.

Some examples of the method 800 and the apparatus described herein may further include operations, features, means, or instructions for determining, by the host device, the first value associated with the memory device operating in the low power state based on initiating the low power state, where writing the first value may be based on determining the first value.

In some examples of the method 800 and the apparatus described herein, the first value may be stored on a first die of the memory device, a second die different than the first die of the memory device, or a package separate from the memory device.

Some examples of the method 800 and the apparatus described herein may further include operations, features, means, or instructions for determining whether one or more registers configured to store a value of the counter may be erased as part of a reset command, where validating the memory device may be based on determining whether the one or more registers may be erased.

It should be noted that the methods described herein describe possible implementations, and that the operations and the steps may be rearranged or otherwise modified and that other implementations are possible. Further, portions from two or more of the methods may be combined.

An apparatus is described. The apparatus may include a memory array and a controller coupled to the memory array and configured to cause the apparatus to receive, from a host device by a memory device, a first command to enter a low power state, increment a counter of the apparatus operating in the low power state based on receiving the first command to enter the low power state, receive, from the host device, a second command to exit the low power state, and write a mode register of the memory device with a value of the counter based on receiving the second command to exit the low power state.

Some examples may further include receiving, from the host device, an indication that the memory device may be validated based on a difference between a first value of the counter associated with entering the low power state and a second value of the counter associated with exiting the low power state.

Some examples may further include receiving, from the host device, a second value of the counter stored by the host device based on receiving the first command, and validating, after exiting the low power state, the memory device based on a difference between the value of the counter associated with exiting the low power state and the second value satisfying a threshold received from the host device.

An apparatus is described. The apparatus may include a memory device and a controller coupled with the memory device an configured to cause the apparatus to initiate a low power state of a memory device, write a first value of a counter of the memory device operating in the low power state based on initiating the low power state, transmit, to the memory device by a host device, a first command to enter the low power state based on the first value, transmit, to the memory device by the host device, a second command to exit the low power state based on the first value, identify a second value of the counter based on transmitting the second command, and validate the memory device based on a difference between the first value and the second value.

Some examples may further include determining the difference between the first value and the second value based on identifying the second value, where validating the memory device may be based on determining the difference.

Some examples may further include determining that the difference between the first value and the second value may be one based on identifying the second value, where validating the memory device may be based on determining that the difference may be one.

Some examples may further include determining that the difference between the first value and the second value may be greater than one based on identifying the second value, where validating the memory device further may be executable by the processor to cause the apparatus to perform a corrective operation based on determining that the difference may be greater than one.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial materials of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, from a host device and by a memory device, a first command to enter a low power state;
entering, by the memory device, the low power state based at least in part on receiving the first command;
incrementing, while the memory device operates in the low power state and based at least in part on receiving the first command to enter the low power state, a value of a counter of the memory device;
receiving, from the host device, a second command to exit the low power state;
writing, after receiving the second command to exit the low power state, the incremented value of the counter to a mode register of the memory device; and
validating the memory device after exiting the low power state and based at least in part on a difference satisfying a threshold, wherein the difference comprises a difference between the incremented value of the counter and a second value of the counter.

2. The method of claim 1, further comprising:
receiving, from the host device, an indication that the memory device is validated based at least in part on the difference between the incremented value of the counter and the second value of the counter.

3. The method of claim 1, further comprising:
receiving, from the host device and based at least in part on receiving the first command, the second value of the counter, wherein the second value is stored by the host device.

4. The method of claim 3, further comprising:
comparing, based at least in part on receiving the second value, the incremented value with the second value.

5. The method of claim 4, further comprising:
determining, based at least in part on comparing the incremented value with the second value, that the difference between the incremented value and the second value is zero or one, wherein validating the memory device is based at least in part on determining that the difference between the incremented value and the second value is zero or one.

6. The method of claim 4, further comprising:
determining, based at least in part on comparing the incremented value with the second value, that the difference between the incremented value and the second value is greater than one; and
performing, based at least in part on determining that the difference between the incremented value and the second value is greater than one, a corrective operation.

7. The method of claim 6, further comprising:
transmitting, to the host device and based at least in part on performing the corrective operation, an indication of the corrective operation.

8. The method of claim 1, wherein writing the incremented value of the counter to the mode register is based at least in part on performing a write operation, and wherein receiving the second command is based at least in part on incrementing the counter.

9. The method of claim 1, further comprising:
determining that a power parameter of the memory device satisfies a threshold during at least a portion of time that the memory device is operating in the low power state; and
writing, to a non-volatile memory and based at least in part on determining that the power parameter satisfies the threshold, the incremented value of the counter, the second value of the counter, or both the incremented value and the second value.

10. The method of claim 1, further comprising:
determining that a temperature parameter of the memory device satisfies a threshold during at least a portion of time that the memory device is operating in the low power state; and
writing, to a non-volatile memory and based at least in part on determining that the temperature parameter satisfies the threshold, the incremented value of the counter, the second value of the counter, or both the incremented value and the second value.

11. A method, comprising:
initiating a low power state of a memory device;
writing, based at least in part on initiating the low power state, a first value of a counter of the memory device;
transmitting, based at least in part on writing the first value, a first command to enter the low power state, wherein the memory device enters the low power state and increments, while the memory device operates in the low power state, the first value of the counter of the memory device based at least in part on the first command;
transmitting, based at least in part on writing the first value, a second command to exit the low power state;
identifying, after transmitting the second command to exit the low power state, a second value of the counter; and
validating, based at least in part on a difference between the first value and the second value, the memory device.

12. The method of claim 11, further comprising:
determining the difference between the first value and the second value based at least in part on identifying the second value, wherein validating the memory device is based at least in part on determining the difference.

13. The method of claim 11, further comprising:
determining that the difference between the first value and the second value is one based at least in part on identifying the second value, wherein validating the memory device is based at least in part on determining that the difference is one.

14. The method of claim 13, further comprising:
determining that data associated with the memory device is unmodified from when the memory device entered the low power state based at least in part on determining that the difference is one.

15. The method of claim 11, further comprising:
determining that the difference between the first value and the second value is greater than one based at least in part on identifying the second value, wherein validating the memory device further comprises performing, based at least in part on determining that the difference is greater than one, a corrective operation.

16. The method of claim 15, further comprising:
determining that data associated with the memory device was modified during the low power state based at least in part on determining that the difference is greater than one.

17. The method of claim 16, further comprising:
transmitting a third command to execute the corrective operation based at least in part on determining that the data associated with the memory device was modified.

18. The method of claim 11, further comprising:
determining, based at least in part on initiating the low power state, the first value, wherein writing the first value is based at least in part on determining the first value.

19. The method of claim 11, further comprising:
transmitting, to the memory device and based at least in part on transmitting the first command, a third value of the counter, wherein the third value is stored by a host device.

20. The method of claim 11, further comprising:
determining that a duration of time has expired after issuing the first command to enter the low power state, wherein transmitting the second command to exit the low power state is based at least in part on determining that the duration of time has expired.

21. A method, comprising:
initiating, by a host device, a low power state of a memory device;
writing, by the host device and based at least in part on initiating the low power state, a first value of a counter of the memory device;
transmitting, by the host device and based at least in part on writing the first value, a command to enter the low power state;
entering, by the memory device, the low power state based at least in part on the command to enter the low power state;
incrementing, by the memory device while the memory device operates in the low power state and based at least in part on the host device transmitting the command to enter the low power state, the counter;
writing, by the memory device and after the host device transmits a command to exit the low power state, a mode register of the memory device with a second value of the counter; and
validating the memory device, by the host device, after the memory device exits the low power state and based at least in part on a difference between the first value and the second value.

22. The method of claim 21, further comprising:
determining that the difference between the first value and the second value is one based at least in part on writing the mode register of the memory device with the second value of the counter, wherein validating the memory device is based at least in part on determining that the difference is one.

23. The method of claim 22, further comprising:
determining, based at least in part on determining that the difference is one, that data associated the memory device is unmodified from when the memory device entered the low power state.

24. The method of claim 21, further comprising:
determining that the difference between the first value and the second value is greater than one based at least in part on writing the mode register of the memory device with the second value of the counter, wherein validating the memory device further comprises performing, based at least in part on determining that the difference is greater than one, a corrective operation.

25. The method of claim 24, further comprising:
determining, based at least in part on determining that the difference is greater than one, that data associated with the memory device was modified while the memory device was in the low power state based at least in part on determining that the difference is greater than one.

26. The method of claim 21, further comprising:
determining, by the host device and based at least in part on initiating the low power state, the first value, wherein writing the first value is based at least in part on determining the first value.

27. The method of claim 21, wherein the first value is stored on a first die of the memory device, a second die different than the first die of the memory device, or a package separate from the memory device.

28. The method of claim 21, further comprising:
determining whether one or more registers configured to store a value of the counter are erased as part of a reset command, wherein validating the memory device is based at least in part on determining whether the one or more registers are erased.

* * * * *